United States Patent Office 3,398,607
Patented Aug. 27, 1968

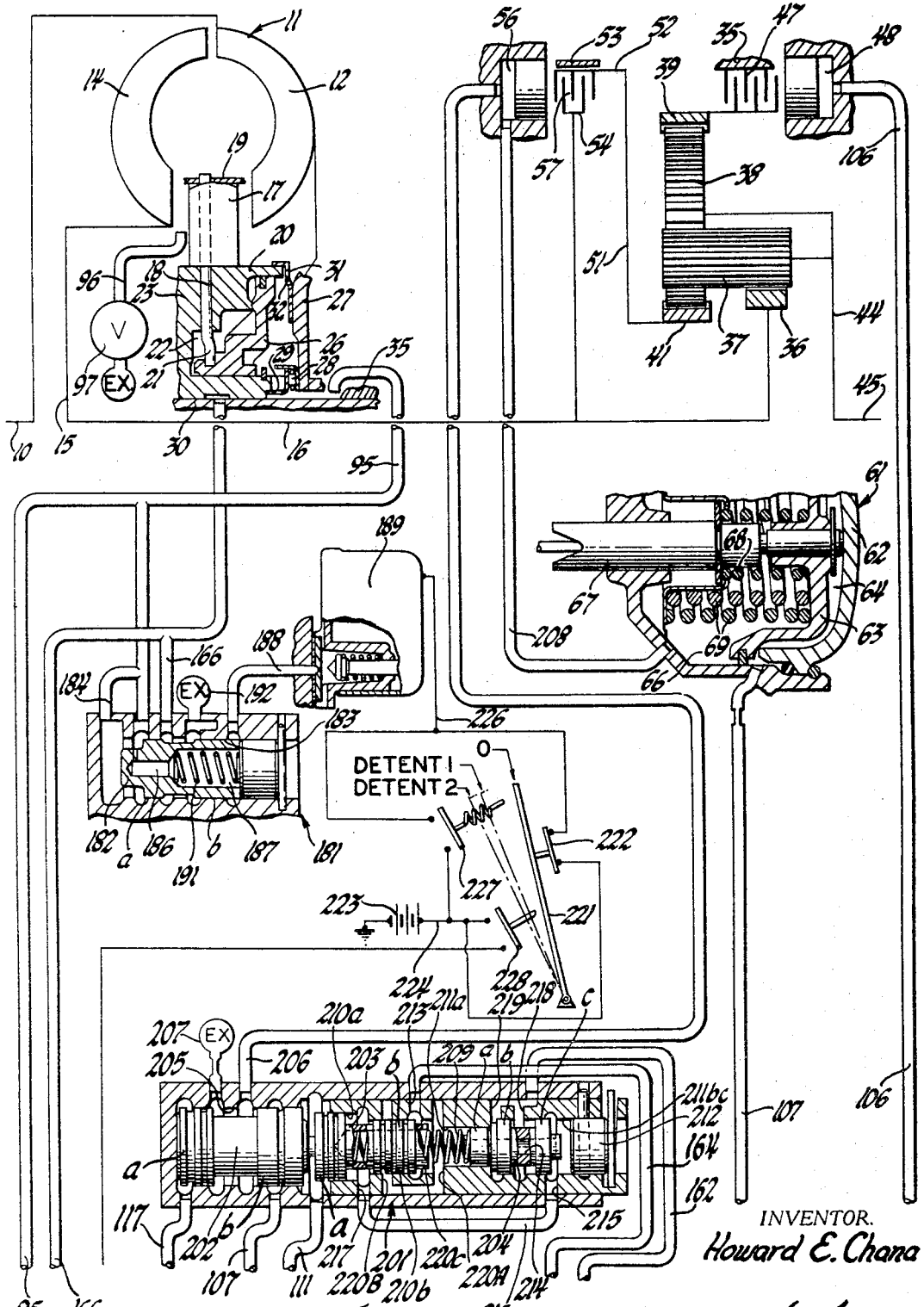

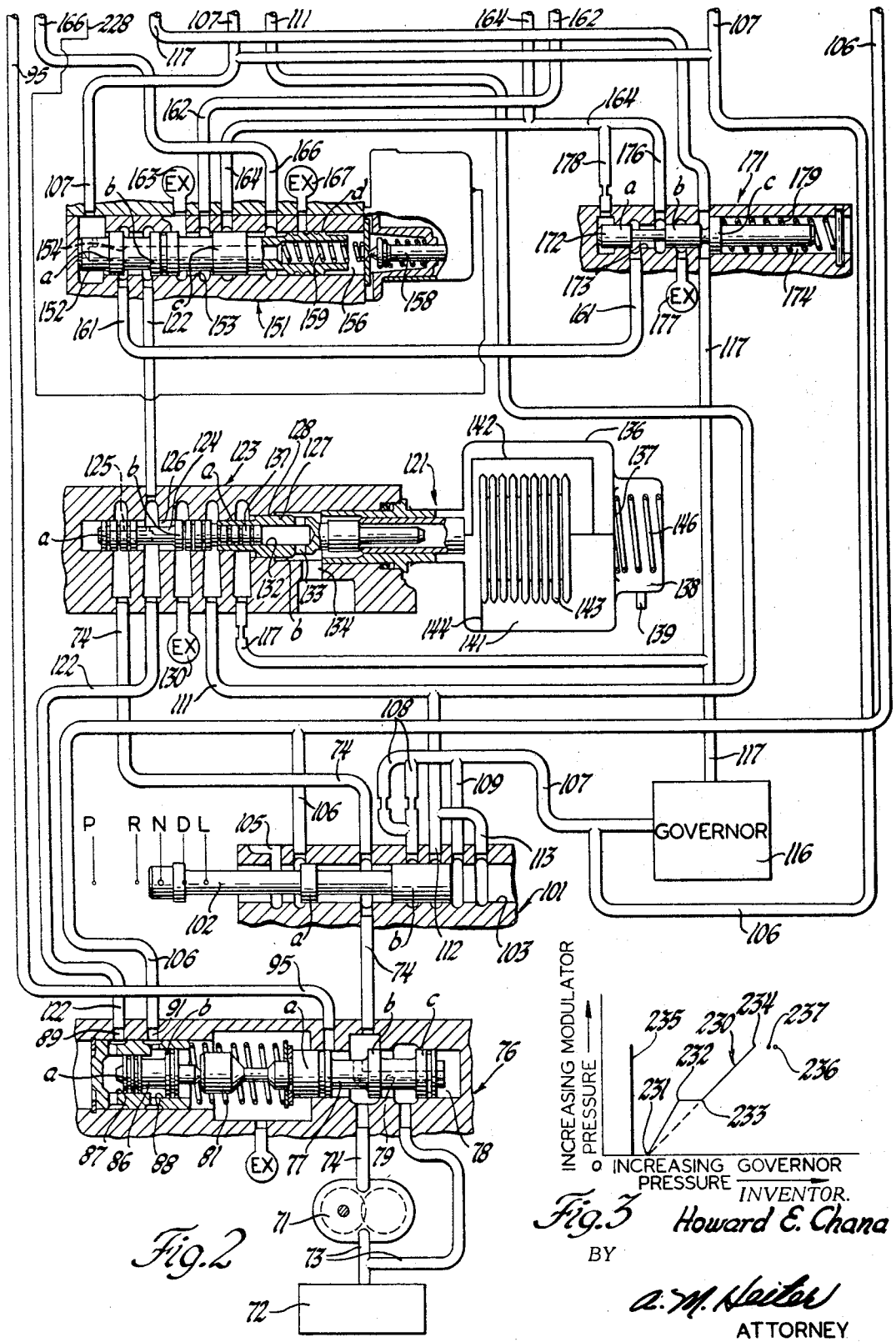

3,398,607
TRANSMISSION
Howard E. Chana, Flint, Mich., assignor to General Motors Corporation, Detroit, Mich., a corporation of Delaware
Filed Oct. 22, 1965, Ser. No. 501,038
16 Claims. (Cl. 74—864)

ABSTRACT OF THE DISCLOSURE

An automatic transmission control providing upshifting controlled by a bias increasing at one ratio in relation to increasing torque demand up to a predetermined torque demand and a bias increasing at another ratio in relation to increasing torque demand above this predetermined torque demand, through detent upshifting and downshifting at predetermined speeds, and closed throttle to detent throttle opening downshifting at a predetermined speed independent of torque demand.

This invention relates to transmissions and more particularly to transmission controls.

In automatic transmissions having a shift valve using engine manifold pressure which is reflective of engine torque as one of the signal pressures for shifting drive ratios, it is difficult to provide the desired shifting characteristics because manifold pressure does not change linearly with respect to throttle opening. As a result, excessive part throttle downshifting and either an extended light throttle shift schedule or an early midrange shift schedule may occur.

The shift valve of this invention provides a split upshift schedule to improve the transmission pressure to engine torque matching and eliminates all part throttle downshifting. This latter feature is to give the operator full control of when the downshift will occur; that is, small throttle openings will not produce an unwanted downshift, the downshift being caused to occur only at a specific coast-down speed or when the throttle is depressed through a detent downshift position.

The shift valve is biased to upshift by a speed responsive governor pressure and biased to downshift by biasing means including a torque demand and speed responsive modulated pressure and a detent pressure which is made available only when the throttle passes through the detent position. From light to medium throttle openings, modulator force plus a spring force oppose the governor pressure force and provides a predetermined upshift schedule. For more than medium to kick-down detent throttle openings, there is provided an increased modulator pressure force plus an increased spring force opposing the governor pressure force to provide a stepped up, predetermined upshift schedule requiring higher speeds for upshifts, the slope of the upshift curve for medium to kick-down detent throttle having a smaller modulator pressure to governor pressure ratio than occurs for light to medium throttle opening. For through detent throttle openings, there is provided a pressure force solely proportional to speed for cooperating with the spring force to oppose the governor pressure force to require a higher governor pressure force than is necessary in the medium to kick-down detent schedule to provide full throttle upshifts at a predetermined speed.

For downshifts from closed throttle and throttle openings to kick-down detent, only the spring force opposes the governor pressure force so that downshift occurs only at a predetermined low governor pressure and coast-down speed. For through detent or full throttle downshifts, the pressure force solely proportional to speed together with the spring force opposes the governor pressure force to provide full throttle downshift at a predetermined higher speed.

An object of this invention is to provide an improved shift control having a speed responsive upshift bias and a torque demand and speed responsive downshift bias.

Another object of this invention is to provide a shift control producing a split upshift schedule and eliminating all part throttle downshift.

Another object of this invention is to provide a shift control providing a split upshift schedule and only a predetermined coast-down speed downshift or through detent speed downshift.

Another object of this invention is to provide a shift valve having a plurality of upshift schedules up to kick-down throttle detent, an increased downshift bias solely responsive to speed for opposing upshift for through detent throttle openings and an effective downshift bias only at a predetermined speed in the closed to kick-down throttle detent range and also through kick-down throttle detent.

Another object of this invention is to provide a shift valve producing one upshift curve determining modulator pressure and governor pressure requirements for an upshift for light to medium throttle openings, a stepped-up upshift curve for medium to detent throttle openings having a smaller modulator pressure to governor pressure ratio than the closed to medium throttle upshift curve, a through detent upshift requiring a higher governor pressure for through detent upshifts at a predetermined speed, a closed throttle to detent throttle opening downshift at a predetermined governor pressure and speed and a through detent, full throttle, downshift at a predetermined speed.

These and other objects of the invention will be more apparent from the following specification and drawing.

FIGURES 1 and 2, when combined, schematically show the transmission and control system.

FIGURE 3 graphically shows the shift valve characteristics.

Referring to FIGURE 1, the transmission input shaft 10 drives the torque converter housing 11 which carries the pump blades 12. The pump blades 12 circulate fluid in the conventional manner within the torque converter torus chamber in housing 11 to the turbine blades 14, which are connected by hub 15 to drive intermediate shaft 16 and to the stator blades 17. The stator blades are rotatably mounted on cranks 18 pivotally mounted in the inner shell portion 19 and the outer shell portion 20 and have an offset 21 located in the annular cylinder 22 formed in a hub member 23. The annular piston 26 is reciprocally mounted in the cylinder 22, suitably sealed at the inner and outer diameters and has an annular groove into which the offset crank portions 21 fit. Between the hub member 23 and the inner portion 27 of the rotary housing 11, there is located a bearing and seal member 28 having suitable apertures 29. The hub portion 27 also carries a seal member 31 having suitable apertures 32 smaller than the apertures 29. Thus the converter feed flow through apertures 29 and 32 always provides a pressure acting on piston 26 to move the piston in a retracting direction to the high angle position. The hub 23 is splined or connected by a one-way brake (not shown) to ground sleeve 30 which is fixed to the transmission housing 35.

The intermediate shaft 16 drives the sun gear 36 which meshes with a long pinion 37 which in turn meshes with a short pinion 38 which is in mesh with the ring gear 39 and the sun gear 41. The long pinion 37 and the short pinion 38 are mounted on the pinion shafts of carrier 44 to drive the output shaft 45. The ring gear 39 is retarded by a suitable friction plate brake 47 mounted on housing 35 and is engaged when fluid pressure is supplied to the fluid motor 48 to provide reverse drive. The sun gear 41 is connected by a hub 51 to a drum 52 which may be retarded by the brake band 53 to provide low ratio drive. The inner hub 54 is connected for rotation with shaft 16. When fluid pressure is supplied to the fluid motor 56 engaging the clutch 57 located between drums 54 and 52, drum 54 drives drum 52 to cause the sun gear 41 to rotate with shaft 16 for direct drive in the gear set.

The low band 53 is engaged by a motor 61 having a housing 62 which is divided by the piston 63 into an apply chamber 64 and a release chamber 66. The piston 63 is mounted on the piston rod 67 for limited axial movement and the spring 68 lightly cushions the transfer of the apply force from the piston to the piston rod during initial movement of the piston while the springs 69 control the rate of apply during engagement and provide a release force. Movement of the piston on the piston rod 67 to the left as viewed in FIGURE 1 will engage band 53 through conventional linkage (not shown).

CONTROL SYSTEM

Fluid supply

The input driven pump 71 pumps fluid from the sump 72 and the suction line 73 and supplies it to the main line 74.

The pressure in the main line 74 is regulated by the regulator valve 76 which has a regulator valve element 77 having equal diameter lands $a$, $b$ and $c$ located in bore 78. The space between the lands $a$ and $b$ is connected by restricted passage 79 to the closed bore chamber at the end of the valve to provide a damped pressure biasing force on the valve which is opposed by the biasing force of spring 81 which is grounded on the valve housing. The boost valve 86 has a small and $a$ in small bore 87 and a large land $b$ in large bore 88. Modulator pressure supplied via port 89 and reverse pressure supplied via port 91 independently increase line pressure. In the first regulating stage, valve 77 connects the main line 74 to the converter line 95 to supply fluid under regulated pressure to both the main line and the converter line 95. In the second stage of regulation normally at higher engine speeds, main line 74 remains connected to converter line 95 and is also connected to the suction line 73 to bypass excess oil to suction directly and thus maintain the regulated pressure. The converter line 95 supplies fluid to the torus or operating chamber of the torque converter to condition the converter for operation and provide a pressure acting on stator control piston 26 to bias the piston and stator blades to high angle position. The converter outlet line 96 has a pressure relief valve 97 to maintain proper converter pressure. The exhaust from this valve is cooled and used for lubrication and returned to sump.

MANUAL VALVE

A manual valve 101 routes oil to the controlling devices in accordance with the drive position in which it is placed. The valve element 102 having lands $a$ and $b$ of equal diameter is located in bore 103. In all valve positions, main line 74 is connected through the valve, either through the bore or through the annular groove in the body when the bore is blocked by the land $b$. In the park P and the neutral N positions of the valve no additional connections are provided. In reverse R, line 74 is connected to the reverse line 106. In the drive position, the main line is connected to the drive line 107 via the restricted branches 108, the non-restricted branch 109 being blocked. In low position, the drive connection remains the same and fluid is also supplied to the modulator boost line 111 via the branch 112 while the exhaust branch 113 is blocked by the land $b$. In neutral and drive, the modulator boost line 111 is connected by branch 113 to exhaust. In neutral, the drive line 107 is connected by branch 109 to exhaust. In reverse, modulator boost branches 112 and 113 and drive branch 109 are connected to exhaust. In park, all drive and modulator boost branches are exhausted, land $b$ blocks line 74 from the bore but the line remains connected through the valve body and reverse line 106 is connected to exhaust 105.

GOVERNOR

A conventional governor 116 is supplied with fluid by the drive line 107 and driven at or proportional to the speed of the driven shaft to provide in governor line 117 a pressure proportional to driven shaft speed.

VACUUM MODULATOR AND VALVE

The vacuum modulator and valve assembly 121 translates load and torque demand from engine manifold vacuum, barometric pressure or altitude and speed or governor pressure into modulated pressure in modulator line 122.

The modulator valve 123 has a regulator valve element 124 having lands $a$ and $b$ of equal diameter located in bore 126 and a control plug 127 having a small land $a$ in bore 126 and a larger diameter land $b$ located in bore 128.

The regulator valve element 124 has a passage 125 connecting the space between lands $a$ and $b$ to the closed end of bore 126. The valve element 124 also has a small stem end 131 having a sliding sealed fit in bore 132 in plug 127. Bore 132 is vented by exhaust 133 and bore 128 is vented by exhaust 134.

The vacuum modulator has a housing 136 fixed to the valve body. A diaphragm 137 divides the housing into a vacuum chamber 138 connected to engine manifold vacuum line 139 and an atmospheric chamber 141 open to atmosphere. A rigid U-shaped strut assembly 142 connects the diaphragm to plug 127. An aneroid or evacuated closed bellows 143 is fixed at one end by support 144 to housing 136 and at the other end is fixed to the diaphragm and strut. The atmospheric pressure acting to collapse the bellows against the resilience thereof or a spring therein and modifying spring 146 provides a force acting through the strut to bias the valve to the left for increased pressure. Increasing engine vacuum in chamber 138 and decreasing atmospheric pressure around bellows 143 reduces this force and thus the modulated pressure.

The vacuum modulator applies through plug 127 a force to regulator valve element 124 to tend to connect main line 74 to modulator line 122 to increase pressure while modulator pressure via passage 125 acts to bias the valve to tend to connect modultaor line 122 to exhaust 130 to reduce the modulator pressure. Thus the modulated pressure increases with decreasing vacuum or increased torque demand but is decreased with increased altitude. Governor pressure via line 117 acts on the unbalanced area of land $b$ to reduce modulated pressure with increasing speed. With the manual valve in low position, main line pressure via modulator boost line 111 is connected between regulator valve element 124 and plug 127 to increase modulator pressure to a minimum value at low modulator pressures. At wider open throttle positions which provide low vacuum, the bellows provides a sufficiently high force to move plug 127 into contact with valve element 124 against the separating force of modulator boost pressure to provide normal regulation of modulator pressure at the higher values.

DETENT VALVE

The detent valve 151 provides a downshift at detent throttle position if car speed is low enough. The detent valve element 152 has lands $a$, $b$, $c$ and $d$ of equal diameter in bore 153. Line pressure in drive line 107 is connected to the closed end of bore 153 to act on land $a$ to bias valve element 152 to the right to detent position and flows through restricted passage 154 in valve element 152, to the control chamber 156 at the other end of the bore and exhausts through the solenoid valve 158. The spring 159 has insufficient force to move the valve against the fluid force. When the solenoid valve is deenergized and closed by a spring, the pressure increases to line pressure in chamber 156, the valve is balanced and the spring 159 moves the detent valve to the normal position shown.

In the normal position shown, the detent valve element 152 connects modulator line 122 to limit valve feed line 161, detent line 162 to exhaust 163 and blocks limited modulator line 164 and stator line 166. When the solenoid valve 158 is energized and open, the valve 152 is in detent position and connects main line pressure from drive line 107 to limit valve feed line 161, blocks modulator line 122, connects limited modulator line 164 to detent line 162 and connects stator line 166 to exhaust 167.

MODULATOR LIMIT VALVE

The modulator limit valve 171 is a speed responsive pressure regulator valve that controls the speed at which wide open throttle up and down shifts can be made. The valve 171 has a valve element 172 having lands $a$ and $b$ in bore 173 and a larger land $c$ in bore 174. The limited modulator line 164 has a branch 176 which is connected to bore 173 between the limit valve feed line 161 and exhaust 177. The limited modulator line 164 has a restricted branch 178 connected to the closed end of bore 173 to act on land $a$ to bias the valve in a pressure decreasing direction while spring 179 in the vented portion of bore 174 biases the valve in the opposite or pressure increasing direction to regulate the limited modulator pressure. Governor pressure in line 117 is always connected through valve 171 and acts on the unbalanced area of land $c$ to reduce the limited modulator pressure with increasing speed.

STATOR CONTROL VALVE

The stator control valve 181 controls stator blade pitch and has a valve element 182 having lands $a$ and $b$ in bore 183 which is closed at both ends. The stator line 166 is connected to bore 183 between lands $a$ and $b$ in both valve positions. A branch 184 of the converter line 95 is connected to one end of bore 183 and communicates at all times with restricted passage 186 extending axially through valve element 182 to a control chamber 187 at the other end of the bore. The chamber 187 may be vented by exhaust line 188 and solenoid valve 189. When the solenoid valve 189 is energized, opening the valve and exhaust line 188 to vent the chamber, the converter fluid, entering via branch 184, moves valve element 182 against the bias of spring 191 to exhaust the stator blade motor for high angle position. In this position stator line 166 is connected to exhaust 192. When the solenoid valve is de-energized and closed, pressure equalizes at both ends of the valve element 182 and the spring 191 moves the valve to the low angle position connecting the converter line 95 to stator line 166.

SHIFT VALVE

The shift valve 201 controls the shift from low to high ratio and comprises a shift valve element 202, a shift control valve element 203 and a modulator control valve element 204. The shift valve element 202 has lands $a$ and $b$ and is mounted in a bore 205, land $b$ having a slightly larger diameter than land $a$ to provide a hysteresis effect for holding the shift valve element in the upshifted position. Governor pressure is connected via line 117 to the closed left-end of bore 205 to act on the end of shift valve element land $a$ to tend to upshift the valve against the downshift biasing force transmitted by shift control valve element 203.

In the low or downshift position shown, shift valve element 202 connects a high clutch line 206 serving high clutch motor 56 between its lands $a$ and $b$ to an exhaust 207, land $b$ blocking drive line 107 from bore 205. In the high or upshift position, shift valve element 202 connects drive line 107 between its lands $a$ and $b$ to the high clutch line 206 and high clutch motor 56 to engage the high clutch, land $a$ blocking bore 205 from exhaust 207. The fluid supplied to the high clutch motor also flows via a band relief line 208 to band relief chamber 66 to equalize the pressure on piston 63 so springs 69 can release the brake band 53.

The shift control valve element 203, modulator control valve element 204 and a spring 209 arranged between and engaging these elements provide a downshift biasing force transmitted by shift control valve element 203 opposing the governor pressure force on shift valve element 202 to effect a split upshift schedule, a predetermined coast-down speed downshift below full throttle and full throttle upshifts and downshifts at predetermined speeds. The split upshift schedule is to provide improved shift feel up to kick-down detent by improving the matching of transmission pressure to engine torque since manifold pressure, which is the engine torque signal pressure from the modulator valve 123, does not change linearly with respect to throttle opening. That is, small changes in throttle opening near idle produce large changes in manifold pressure and large changes in throttle opening near full throttle produce small changes in manifold pressure. The predetermined coast-down speed downshift below full throttle is to provide full operator downshift control by preventing all part throttle downshifting so that the operator can open the throttle by small degrees and not get an unwanted downshift. The downshift is instead caused to occur only at a specific coast-down speed.

The shift control valve element 203 has unequal diameter lands $a$ and $b$ with the large land $a$ received in a bore 210$a$ and the small land $b$ received in a bore 210$b$. The modulator control valve element 204 has a land $a$ smaller than land $b$ of valve element 203 and received in a bore 211$a$ and equal diameter lands $b$ and $c$ received in a bore 211$bc$. Bore 211$bc$ is closed at its right end by a plug 212.

For upshifts from light to medium throttle, modulator pressure in line 164 enters through a port 213 to act on the end of land $b$ of valve element 203 and the end of land $a$ of valve element 204 and passes through an axial passage 214 in valve element 204 to act on the end of land $c$ valve element 204. Passage 214 has a cross slot at its right end so that it cannot be blocked by plug 212. The hydraulic force of limited modulator pressure on land $a$ of valve element 204 is to the right and limited modulator pressure on the end of land $c$ of valve element 204 is to the left. Modulator pressures for light to medium throttle are sufficiently low so that the modulator control valve element 204 is held against the plug 212 by spring 209 which overcomes the hydraulic force imbalance in the opposite direction resulting from land $c$ being larger than land $a$. In this position a port 215, which is connected by a line 216 and a port 217 to the shift control valve element 203 between its lands $a$ and $b$, is connected between lands $b$ and $c$ of modulator control valve element 204 to a port 218 connected to detent line 162. The differential area between lands $a$ and $b$ of modulator control valve element 204 is always connected by a port 219 to detent line. Detent line 162 is exhausted by detent valve 151 at light to medium throttle opening and thus the differential areas between lands $a$ and $b$ of shift control valve element 203 and between lands $a$ and $b$ of modulator control valve element 204 are exhausted. Under these conditions the shift control valve element 203 transmits a downshift biasing force to the shift valve element 202 equal to limited modulator pressure multiplied by the end area of land $b$ of shift control valve element 203 plus the normal spring force of spring 209.

For upshifts from more than medium to kick-down detent throttle openings, modulator pressure enters through port 213 as it did during light to medium throttle openings but, however, modulator pressure acting on the differential area between lands $a$ and $c$ of valve element 204 is sufficient to move the modulator control valve element 204 against spring 209 to the left-hand position shown, connecting passage 214 to port 215 so that modulator pressure now acts on the differential area between lands $a$ and $b$ of shift control valve element 203. Under these conditions, the shift control valve element 203 transmits a larger force to the shift valve element 202 which force is equal to limited modulator pressure multiplied by the end area of land *b* of valve element 203 plus limited modulator pressure multiplied by the exposed area of land *a* of valve element 203 minus the exposed area of land *b* of valve element 203 plus the increased spring force of spring 209 resulting from the spring compression.

For through detent (full throttle) upshifts, modulator pressure and the then available detent pressure are the same and solely proportional to speed. The hydraulic forces on the modulator control valve element 204 are balanced and the spring force of spring 209 pushes valve element 204 to its right hand position. Limited modulator pressure through port 213 acts on the end area of land *b* of valve element 203 and land *a* of valve element 204 and detent pressure through ports 218, 215 and 217 acts on the differential area between lands *a* and *b* of valve element 203 and through port 219 acts on the differential area between lands *a* and *b* of valve element 204. The shift control valve element 203 then transmits a force to the shift valve element 202 equal to limited modulator pressure multiplied by the end area of land *b* of valve element 203 plus detent pressure, which is the same as limited modulator pressure, multiplied by the exposed area of land *a* minus the exposed area of land *b* of valve element 203 plus the normal spring force of spring 209.

For downshifts with zero throttle and throttle openings to kick-down detent, whenever the shift valve is in the upshift position, port 213 is blocked by land *b* of shift control valve element 203 and a port 220A which is connected to bores 210*b* and 211*a* between valve elements 203 and 204 is connected by a port 220B and between lands *a* and *b* of valve element 203 to the port 217. The right end of valve element 203 is lanced at 220C so that port 220A is never blocked by valve element 203. The port 215 and connected ports 220A, 220B and 217 are connected between lands *b* and *c* of valve element 204 to the exhausted detent line 162 via port 218, the detent line being exhausted in all throttle positions up to the kick-down detent throttle position. The only leftward force exerted on the shift control valve element 203 is now the normal spring force of spring 209. The rightward forces on the shift valve element 202 are equal to governor pressure acting on the end of land *a* of valve element 202 and drive pressure in line 107 acting on the difference in areas of lands *b* and *a* of valve element 202. A downshift will occur when the forces are such that the shift valve element 202 will move to its left-hand or downshift position.

For through detent (full throttle) downshifts, detent pressure and limited modulator pressure are equal and solely proportional to speed and this pressure will travel from detent line 162 through ports 218, 215, 217, 220B and 220A, the modulator control valve element 204 being hydraulically balanced and held in its right-hand position by spring 209. Under these conditions, the shift control valve element 203 exerts a force to the left on the shift valve element 202 equal to detent or limited modulator pressure multiplied by the end area of land *b* of valve element 203 plus detent or limited modulator pressure multiplied by the area of land *a* minus land *b* of valve element 203 plus the normal spring force of spring 209. Once again the downshift will occur only when the forces are such that the shift valve element 202 will move to its left-hand or downshift position.

When the manual valve 101 is in low, modulator boost pressure in line 111 is delivered to the chamber between shift valve element 202 and the shift control valve element 203 to downshift the valve element 202 and hold the transmission in low.

THROTTLE LINKAGE

A portion of the throttle linkage as shown, for example, by the throttle or accelerator pedal 221 in closed throttle position (O), closes switch 222 to connect battery 223, via positive line 224 to the stator line 226 to energize stator solenoid valve 189 for high angle to reduce creep when stopped. As the throttle leaves closed position, switch 222 opens and the solenoid is disengaged for low angle. When throttle pedal 221 reaches predetermined mid throttle or first detent position (Detent 1), switch 227 is engaged to connect the battery to line 226 to engage solenoid 189 for high angle for increased torque multiplication. Further movement of the throttle pedal to downshift detent position or second detent position, through a lost motion spring continues to hold switch 227 closed and also closes switch 228 to energize detent solenoid 158 to actuate the stator and detent valve 151.

OPERATION

With the manual valve 101 in neutral and the throttle closed, pump 71 supplies pressure regulated by the regulator valve 76 to main line 74 which is blocked at the manual valve 101 and modulator valve 121. The regulator valve 76 also supplies fluid at main line pressure to the torque converter and the stator control valve 181. As the throttle is closed, switch 222 is closed energizing solenoid valve 189 to move stator control valve 181 to the exhaust position exhausing cylinder 22 and placing the stator blades in high angle to limit creep.

When the manual valve 101 is moved from neutral to drive position, the connections established in neutral remain and in addition the manual valve supplies main line pressure to the drive line 107. The drive line supplies main line pressure to the governor 116 which, as the load or vehicle moves, provides a pressure proportional to speed, to the low band apply chamber 64 to establish low ratio drive, to the shift valve 201 which at low speeds blocks the pressure and exhausts the high clutch motor 56 and low band release chamber 66 and to the detent valve 151. The stator blades are in high angle to limit creep.

As the throttle moves from closed throttle position, switch 222 opens deenergizing solenoid valve 189 to block exhaust line 188, balancing the pressure on opposite ends of valve element 182 so spring 191 moves stator valve element 182 to connect converter pressure line 95 to the stator control line 166 and move the stator motor and blades to the low angle position. The detent valve 151 being in the normal position blocks the stator line 166.

With increasing throttle the engine manifold vacuum is reduced and the modulator valve 121 regulates modulator pressure in line 122 at proportionally increasing pressures which are corrected by a decreasing pressure correction with increased altitude or decreasing barometric pressure and a decreasing correction with increasing vehicle speed. The modulator pressure is applied to land *a* of plug 86 of the main line pressure regulator valve 76 to increase main line pressure in line 74 proportional to modulator pressure.

The modulator pressure is connected by detent valve 151 via limit valve feed line 161 to the modulator limit valve 171. This pressure regulator valve limits modulator pressure to a pressure value which decreases with increasing speed when the modulator pressure exceeds this value. The modulator pressure would tend to exceed the limit pressure only at or substantially at full throttle and particularly at high atmospheric pressures. Thus the limit valve limits the speed at which full throttle up and down shifts will be made.

The limited modulator pressure in line 164 and thus in port 213 is directed to act on land *b* of shift control valve element 203 and lands *a* and *c* of modulator control valve element 204. For light to medium throttle openings, modulator pressure is low enough to permit spring 209 to hold the modulator control valve element 204 in the right-hand position abutting plug 212. In this position the modulator control valve element 204 connects port 215 to port 218 to exhaust shift control valve element 203 between its lands *a* and *b* via detent line 162 and exhaust 163 at the detent valve 151. The modulator control valve element 204 between its lands *a* and *b* is exhausted to the detent exhaust 163 via port 219 and detent line 162. The shift control valve element 203 transmits a downshift force equal to limited modulator pressure multiplied by the area of land *b* of valve element 203 plus the normal spring force of spring 209 with the modulator control valve element 204 bottomed out to the right and provides a light to medium upshift schedule as illustrated in FIGURE 3 by curve 230 between points 231 and 232. When the speed increases so that governor pressure acting on land *a* of shift valve element 202 overcomes the spring 209 and the limited modulator force acting on land *b* of shift control valve element 203, the shift valve moves to connect drive line 107 to the high clutch line which is also connected to the low band release line 208 to engage the high clutch and release the low brake. The changes in modulator pressure are large in comparison with the changes in governor pressure in the light to medium throttle shift schedule as shown by the curve between points 231 and 232. With the shift valve in low and in the medium to kick-down detent throttle opening range, limited modulator pressure enters through port 213 as it did in the light to medium throttle opening range. However, limited modulator pressure at medium throttle is sufficiently large to provide a large enough unbalanced hydraulic force on valve element 204 to move the modulator control valve element 204 to its left-hand position against the bias of spring 209 to the step of bore 211*bc* as shown to connect passage 214 to port 215. This causes a shift in the upshift curve 230 to the right from the point 232 to the point 233, due mainly to the added pressure force provided by modulator pressure acting on the unbalanced area of land *a* of valve element 203, to provide step-over to the medium to kick-down detent upshift schedule as illustrated by the curve 230 between the points 233 and 234. In this shift schedule the shift control valve element 203 transmits a downshift biasing force to the shift valve element 202 equal to modulator pressure multiplied by the area of land *b* of valve element 203 plus limited modulator pressure multiplied by the differential area of lands *a* and *b* of valve element 203 which are acted on by pressure delivered via ports 217 and 215 plus the increased spring force. The increase in spring force is small in comparison with the added hydraulic force provided by modulator pressure acting on the unbalanced area of land *a* of valve element 203. In this upshift schedule and as shown by the upshift curve between the points 233 and 234, changes in modulator pressure compare closely with changes in governor pressure. Thus, the medium to kick-down detent upshift schedule has a smaller modulator pressure to governor pressure ratio than the light to medium upshift schedule. In the medium to kick-down detent upshift schedule, when the speed increases so that governor pressure, which must now at least exceed light to medium throttle governor upshift pressure, acting on land *a* of shift valve element 202 overcomes the increased spring force of spring 209 and limited modulator pressure acting on the differential area between lands *a* and *b* and fully on the end of land *b* of shift control valve element 203, the shift valve connects drive line 107 to the high clutch line 206 which is also connected to the low band release line 208 to engage the high clutch and release the low band. Thus, upshifts occur at higher speeds in the medium to kick-down detent range as compared with the lower speed light to medium throttle upshifts.

On the upshift end and in the zero throttle to kick-down detent throttle range, port 213 is blocked by land *b* of shift control valve element 203 and ports 220A, 220B, 217 and 215 are vented to the detent line 162 via valve element 204 and port 218, the detent line being connected by the detent valve 151 to the detent exhaust 163. Under these conditions the only force exerted on the shift valve element 202 to the left is the spring force of spring 209. The shift valve element forces to the right are equal to governor pressure acting on land *a* of the shift valve element 202 and drive pressure from line 107 acting on the differential area of lands *b* and *a* of valve element 202. Thus, a downshift will occur only when the spring force exceeds the hydraulic forces acting on the shift control valve element 203 to move valve element 202 to the downshift position shown to connect the high clutch line 206 and connected low band release line 208 to exhaust 207 to disengage the high clutch and permit engagement of the low band. This zero throttle and throttle openings to kick-down detent downshift are illustrated by the curve 235 in FIGURE 3 which curve pictorially shows that the downshift will only occur at a specific coast-down speed in all throttle positions below kick-down detent, the downshifting occurring at a predetermined governor pressure.

At the first detent position of the throttle at or near mid throttle, the throttle pedal 221 closes switch 227 to energize solenoid valve 189 to move stator control valve 181 to the high angle position exhausting converter pressure from stator line 166 and motor cylinder 22 to exhaust 192 to move the stator blades to high angle for improved performance or torque multiplication.

Further movement of the throttle pedal to the kick-down shift detent or second detent position also closes switch 228 to energize solenoid valve 158 to move detent valve 151 to detent position. In this position detent valve 151 connects main line pressure from drive line 107 via the limit valve feed line 161 to the limit valve 171. The limit valve receives main line pressure and supplies limited modulator pressure to line 164 at a value proportional to speed which is above low modulated pressure values but lower than high modulated pressures at full throttle and high atmospheric pressures to provide full throttle detent up and down shifts at predetermined speeds unaffected by altitude. The modulated pressure is blocked at the detent valve and thus only connected to the regulator valve. The limited modulator pressure line 164 is connected at the detent valve 151 to the detent line 162 so this pressure, which is solely proportional to speed as determined by limit valve 171, is made available to ports 213, 218 and 219 of the shift valve. The hydraulic forces on the modulator control valve element 204 with the shift valve in low are equal and the spring 209 pushes this valve element to its right end position. Limited modulator pressure through port 213 acts on land *b* of the shift control valve element 203 and lands *a* and *c* of valve element 204 and detent pressure which is equal to limited modulator pressure acts on lands *a* and *b* of valve element 204 and passes through ports 218, 215 and 217 to act on the differential area between lands *a* and *b* of the shift control valve element 203. Upshift occurs when governor pressure acting on land *a* of shift valve element 202 overcomes the forces of limited modulator pressure multiplied by the area of land *b* of valve element 203 plus detent pressure, which is the same as limited modulator pressure, multiplied by the differential area between lands *a* and *b* of shift control valve element 203 plus the normal spring force of spring 209. Thus, when the throttle passes through the kick-down detent throttle position, the shift valve 201 upshifts to high only at a predetermined higher speed as illustrated by the point 236 in FIGURE 3.

With the shift valve conditioning the transmission for high and for through detent (full throttle) downshifts, detent pressure, which is equal to limited modulator pressure, travels through ports 218, 215, 217, 220B and 220A, limited modulator port 213 being blocked by land *b* of valve element 203. Under these conditions the shift control valve element exerts a downshift biasing force to the left on the shift valve element 202 equal to detent or limited modulator pressure multiplied by the area of land *b* of shift control valve element 203 plus detent or limited modulator pressure multiplied by the differential area between lands *a* and *b* of the shift control valve element 203 plus the normal spring force of spring 209. Thus, the downshift will occur only when the upshift biasing force provided by the hydraulic forces acting on shift valve element 202 are overcome by these downshift biasing forces to move the shift valve element 202 to its left-hand position to effect the downshift observing that the hysteresis of the shift valve element 202 provides a slightly lower downshift speed as illustrated by the point 237 in FIGURE 3 to prevent hunting of the shift valve.

In detent, while the stator control valve 181 remains in the high angle position, the detent valve 151 connects stator control line 166 to exhaust 167 and the stator blades remain in high angle position.

When the manual valve 101 is moved to the low range position L, the connections established in drive remain connected and main line 74 is connected to modulator boost line 111 which is connected to the modulator valve 121 to increase modulator pressure in the low range above a minimum value and permit normal modulator regulation in the high range of pressure regulation by the modulator valve. The modulator pressure in turn accordingly increases minimum main line pressure in low range. The main line pressure is also connected by the modulator boost line 111 to the shift valve between the shift valve element 202 and the shift control valve element 203 to positively hold shift valve element 202 in low drive position.

In low, the stator controls will operate as in drive range but the detent valve will be ineffective since the shift valve is not upshifted.

Movement of the manual valve 101 from neutral N to reverse R continues the connections established in neutral and supplies main line pressure to the plug 86 of regulator valve 76 to increase main line regulated pressure and via reverse line 106 to reverse motor 218 to engage the reverse brake 47 to establish reverse drive. The stator controls function as in drive.

In park position the manual valve blocks the main line and connects the lines at this valve to exhaust.

The invention may be modified within the scope of the appended claims.

I claim:

1. In a transmission, a multiratio unit having ratio establishing means for establishing a low and a high ratio drive, shift control means operatively connected to said ratio establishing means having a low position for establishing said low ratio drive and a high position for establishing said high ratio drive and including torque demand responsive means, speed responsive means operatively connected to said shift control means for increasingly biasing said shift control means to said high position with increasing speed, torque demand means operatively connected to said torque demand responsive means for increasingly biasing said shift control means to said low position with increasing torque demand, said torque demand responsive means including small and large bias determining means operative in said low position of said shift control means for providing in response to increasing torque demand a bias on said shift control means determined by said small bias determining means increasing at one ratio in relation to torque demand up to a predetermined torque demand and a bias on said shift control means determined by said large bias determining means increasing at another ratio in relation to torque demand above said predetermined torque demand and said shift control means also including means operatively connected between said small and large bias determining means and said torque demand means operative in said high position for disconnecting said torque demand means from said small and large bias determining means to provide a downshift at a predetermined speed independent of torque demand.

2. The invention defined in claim 1 and detent control means operatively connected between said torque demand responsive means and said torque demand means for establishing a downshift bias on said shift control means solely responsive to speed.

3. The invention defined in claim 1 and detent control means operatively connected between said torque demand responsive means and said torque demand means for disconnecting said torque demand means from said torque demand responsive mean to establish a downshift bias on said shift control means solely responsive to speed.

4. The invention defined in claim 1 and detent control means operatively connected between said torque demand responsive means and said torque demand means operative at full throttle for disconnecting said torque demand means from said torque demand responsive means to establish a downshift bias on said shift control means solely proportional to speed to effect full throttle up and down shifts at predetermined speeds.

5. The invention defined in claim 1 and means responsive solely to speed to limit the maximum bias of said torque demand means.

6. The invention defined in claim 1 and said torque demand means comprising vacuum modulator means which is operated by manifold vacuum and corrects for altitude changes.

7. In a transmission, a gear unit having fluid actuated ratio establishing means for establishing a low and a high ratio drive, a source of fluid under pressure, shift valve means operatively connected to said source and said ratio establishing means having a low position for establishing said low ratio drive and a high position for establishing said high ratio drive, speed responsive means operatively connected to said source and said shift valve means to provide a governor pressure for increasingly biasing said shift valve means to said high position with increasing speed, torque demand means operatively connected to said source and said shift valve means to provide a torque demand pressure for increasingly biasing said shift valve means to said low position with increasing torque demand, said shift valve means including torque demand responsive means responsive to said torque demand pressure in a low torque demand range to maintain a small pressure responsive area of said shift valve means connected to said torque demand pressure and also responsive to a predetermined torque demand pressure at the upper limit of said low torque demand range and the lower limit of a high torque demand range to connect a large pressure responsive area of said shift valve means to said torque demand pressure so that the torque demand downshift bias in said high torque demand range is larger than in said low torque demand range and said shift valve means having means operative in said high position to disconnect said torque demand means from said shift control means.

8. The invention defined in claim 7 and said shift valve means including a shift control valve operative to disconnect said torque demand means from said shift valve means in said high position.

9. The invention defined in claim 7 and downshift means operatively connected to said source and said shift valve means operative at full throttle to provide a pressure solely responsive to speed to bias said shift valve to said low position.

10. The invention defined in claim 7 and limit regulator valve means operatively connected to said torque demand means and said speed responsive means responsive only to speed for limiting said torque demand pressure to a maximum pressure value.

11. The invention defined in claim 10 and a manual downshift valve operatively connected to said torque demand means, said limit regulator valve means, said source and shift valve means operable in a normal position to connect said torque demand means, said limit regulator valve means and said shift valve means to supply limited torque demand pressure to said shift valve means and in a detent position to connect said source to said limit regulator valve means and said shift valve means to provide a downshift position providing a downshift biasing pressure acting on said shift valve means responsive only to speed.

12. The invention defined in claim 7 and said torque demand means including means to reduce the torque demand downshift bias with increasing speed.

13. The invention defined in claim 7 and manual means operatively connected to said shift valve means to position said shift valve means in said low position and operatively connected to said torque demand means to maintain said torque demand pressure above a predetermined minimum pressure and means to regulate the pressure of said source in proportion to said torque demand bias.

14. In a transmission, a gear unit having fluid actuated ratio establishing means for establishing a low and a high ratio drive, a source of fluid under pressure, a shift valve operatively connected to said source and said ratio establishing means having a low position for establishing said low ratio drive and a high position for establishing said high ratio drive, torque demand means providing a torque demand pressure responsive to torque demand, a shift control valve operatively connected to said torque demand means and said shift valve having a torque demand position for increasingly biasing said shift valve to said low position with increasing torque demand and a relief position for relieving said shift valve of torque demand bias, speed responsive means operatively connected to said source, said shift valve and said shift control valve to provide a governor pressure for increasingly biasing said shift valve to said high position and said shift control valve to said relief position with increasing speed, biasing means biasing said shift valve to said low position and said shift control valve to said torque demand position, said shift control valve having a pair of unbalanced pressure responsive areas and being operative to connect only one of said pressure responsive areas to said torque demand means in said torque demand position, a modulator control valve connected by said shift control valve to said torque demand means only in said torque demand position operative in a connective position to connect said torque demand means to the other pressure responsive area of said shift control valve and in a disconnective position to disconnect said torque demand means from said other area, said biasing means biasing said modulator control valve to said disconnective position and said torque demand means operatively connected to said modulator control valve in said torque demand position for increasingly biasing said modulator control valve to said connective position with increasing torque demand.

15. The invention defined in claim 14 and limit regulator valve means operatively connected to said torque demand means and said speed responsive means responsive only to speed to limit the maximum bias of said torque demand means.

16. The invention defined in claim 15 and a detent valve operatively connected to said torque demand means, said limit regulator valve means, said source, said shift control valve and said modulator control valve operable in a normal position to connect said torque demand means, said limit regulator valve means and said shift control valve to supply limited torque demand pressure to said shift control valve and in a detent position to connect said source to said limit regulator valve means, said shift control valve and said modulator control valve to provide a downshift biasing pressure responsive only to speed and said modulator control valve being operable in said connective position to deliver the downshift biasing pressure responsive only to speed to act on said other pressure responsive area.

References Cited
UNITED STATES PATENTS

| | | | |
|---|---|---|---|
| 3,000,230 | 9/1961 | Froslie | 74—472 |
| 2,722,296 | 11/1955 | Stoeckicht | 74—472 |
| 3,295,388 | 1/1967 | Groves | 74—472 |
| 3,321,056 | 5/1967 | Winchell et al. | 74—472 X |

FRED C. MATTERN, Jr., *Primary Examiner.*

THOMAS C. PERRY, *Assistant Examiner.*